(12) United States Patent
Shimazaki et al.

(10) Patent No.: US 11,710,873 B2
(45) Date of Patent: Jul. 25, 2023

(54) BATTERY PACK

(71) Applicant: HONDA MOTOR CO., LTD., Tokyo (JP)

(72) Inventors: Itsuki Shimazaki, Saitama (JP); Ryo Fujii, Saitama (JP); Kanae Ohkuma, Saitama (JP); Takaaki Iijima, Saitama (JP); Takahiro Takai, Saitama (JP); Yohei Azuma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 17/192,312

(22) Filed: Mar. 4, 2021

(65) Prior Publication Data

US 2021/0280939 A1    Sep. 9, 2021

(30) Foreign Application Priority Data

Mar. 4, 2020    (JP) ................................ 2020-037275

(51) Int. Cl.
*H01M 50/249*    (2021.01)
*B60K 1/04*    (2019.01)
(Continued)

(52) U.S. Cl.
CPC ............. *H01M 50/249* (2021.01); *B60K 1/04* (2013.01); *B60K 6/28* (2013.01); *B60K 13/04* (2013.01);
(Continued)

(58) Field of Classification Search
CPC ............. H01M 50/249; H01M 50/204; H01M 50/317; H01M 50/358; H01M 2200/20;
(Continued)

(56) References Cited

U.S. PATENT DOCUMENTS 6,457,542 B1 * 10/2002 Hosono .................... B60K 6/26
903/917
2007/0040418 A1 * 2/2007 Ohkuma .................. B60K 1/04
297/15
(Continued)

FOREIGN PATENT DOCUMENTS

CN    101722834 A    6/2010
CN    102119456 A    7/2011
(Continued)

OTHER PUBLICATIONS

Dec. 5, 2022, Chinese Office Action issued for related CN Application No. 202110198682.1.

*Primary Examiner* — James A Shriver, II
*Assistant Examiner* — Nicholas R. Kandas
(74) *Attorney, Agent, or Firm* — Paratus Law Group, PLLC (57) ABSTRACT

A battery pack which is placed below a floor panel of a vehicle, includes a battery, a case for accommodating the battery, and a pressure release mechanism for releasing pressure inside the case. The pressure release mechanism includes a communication member which has one end and the other end and where the one end is connected to the case, and a gas discharge unit connected to the other end of the communication member and having a labyrinth structure.

12 Claims, 9 Drawing Sheets

(51) Int. Cl.
  *B62D 25/20* (2006.01)
  *B60K 13/04* (2006.01)
  *B60K 6/28* (2007.10)
  *H01M 50/204* (2021.01)
  *H01M 50/358* (2021.01)
  *H01M 50/317* (2021.01)
  *B60K 6/26* (2007.10)
  *B60K 6/24* (2007.10)

(52) U.S. Cl.
  CPC .......... *B62D 25/20* (2013.01); *H01M 50/204* (2021.01); *H01M 50/317* (2021.01); *H01M 50/358* (2021.01); *B60K 6/24* (2013.01); *B60K 6/26* (2013.01); *B60K 2001/0438* (2013.01); *H01M 2200/20* (2013.01); *H01M 2220/20* (2013.01)

(58) Field of Classification Search
  CPC ....... H01M 2220/20; B60K 1/04; B60K 6/28; B60K 13/04; B60K 6/24; B60K 6/26; B60K 2001/0438; B62D 25/20
  See application file for complete search history.

(56) References Cited

U.S. PATENT DOCUMENTS

| | | |
|---|---|---|
| 2010/0101883 A1 | 4/2010 | Suzuki |
| 2011/0011654 A1* | 1/2011 | Kubota ................... B60L 50/64 903/903 |
| 2011/0244278 A1* | 10/2011 | Joswig |
| 2012/0070703 A1 | 3/2012 | Wahl et al. |
| 2014/0120387 A1* | 5/2014 | Kinuta ................ H01M 50/333 429/54 |
| 2014/0227565 A1 | 8/2014 | Wan et al. |
| 2015/0147612 A1 | 5/2015 | Nagano et al. |
| 2015/0295215 A1 | 10/2015 | Nagamine et al. |
| 2018/0035573 A1* | 2/2018 | Taguchi |
| 2018/0138479 A1 | 5/2018 | Yamachi |
| 2019/0084395 A1* | 3/2019 | Toyota ................. B60K 15/063 |
| 2019/0198835 A1 | 6/2019 | Oki et al. |
| 2019/0225110 A1* | 7/2019 | Zenner .................... B60L 58/26 |
| 2022/0158294 A1* | 5/2022 | Yoshida ............. H01M 50/249 |

FOREIGN PATENT DOCUMENTS

| | | |
|---|---|---|
| CN | 102369629 A | 3/2012 |
| CN | 202308124 U | 7/2012 |
| CN | 204067470 U | 12/2014 |
| CN | 104302498 A | 1/2015 |
| CN | 104602948 A | 5/2015 |
| CN | 105027323 A | 11/2015 |
| CN | 205303566 U | 6/2016 |
| CN | 107636859 A | 1/2018 |
| CN | 206907878 U | 1/2018 |
| CN | 207558897 U | 6/2018 |
| CN | 109968999 A | 7/2019 |
| CN | 209730011 U | 12/2019 |
| JP | 2017-144925 A | 8/2017 |
| JP | 2018-018726 A | 2/2018 |
| WO | WO 2013/121990 A1 | 8/2013 |

* cited by examiner

BATTERY PACK

CROSS-REFERENCE TO RELATED APPLICATION

The present application claims the benefit of priority of Japanese Patent Application No. 2020-037275, filed on Mar. 4, 2020, the content of which is incorporated herein by reference.

TECHNICAL FIELD

The present invention relates to a battery pack mounted on a vehicle.

BACKGROUND ART

Each cell of a batter, mounted inside a batter pack releases gas to the outside of the cell, that is, inside the battery pack, through a gas discharge valve when the pressure inside the cell increases. Generally, the battery pack has a closed structure, so when the pressure inside the battery pack increases, it is necessary to discharge gas to the outside of the battery pack.

Therefore, in a recent year, a technique has been known in which a gas discharge valve is provided directly on a case of a battery pack or a gas discharge valve is provided via a hose. However, it is necessary to prevent water from entering the case of the battery pack from the gas discharge valve. Therefore, JP2018-018726A describes that a check valve is provided in a gas tube and JP2017-144925A describes a technique for providing a cylinder structure which opens only when the internal pressure of the case increases.

SUMMARY

However, when a complicated structure is adopted to prevent water from entering from a gas discharge unit such as a gas discharge valve, the manufacturing cost increases, so that a simpler structure has been desired.

The present invention provides a battery pack which can suppress the infiltration of water with a simple structure.

According to an aspect of the present invention, there is provided a battery pack which is placed below a floor panel of a vehicle, including:
a battery;
a case for accommodating the battery; and
a pressure release mechanism for releasing pressure inside the case.

The pressure release mechanism includes,
a communication member which has one end and the other end and where the one end is connected to the case, and
a gas discharge unit connected to the other end of the communication member and having a labyrinth structure.

According to the present invention, a gas discharge unit having a labyrinth structure can suppress the infiltration of water into the communication member, thereby suppressing the infiltration of water into the battery pack.

DESCRIPTION OF EMBODIMENT

Hereinafter, an embodiment of a battery pack of the present invention will be described with reference to the drawings. In the drawing, the front of a vehicle equipped with the battery pack is shown as Fr, the rear is shown as Rr, the left side is shown as L, the right side is shown as R, the upper side is shown as U, and the lower side is shown as D. However, a mounting posture of the battery pack is not limited to this.

Vehicle

First, an example of a vehicle equipped with a battery pack of the embodiment will be described.

Figure 1:
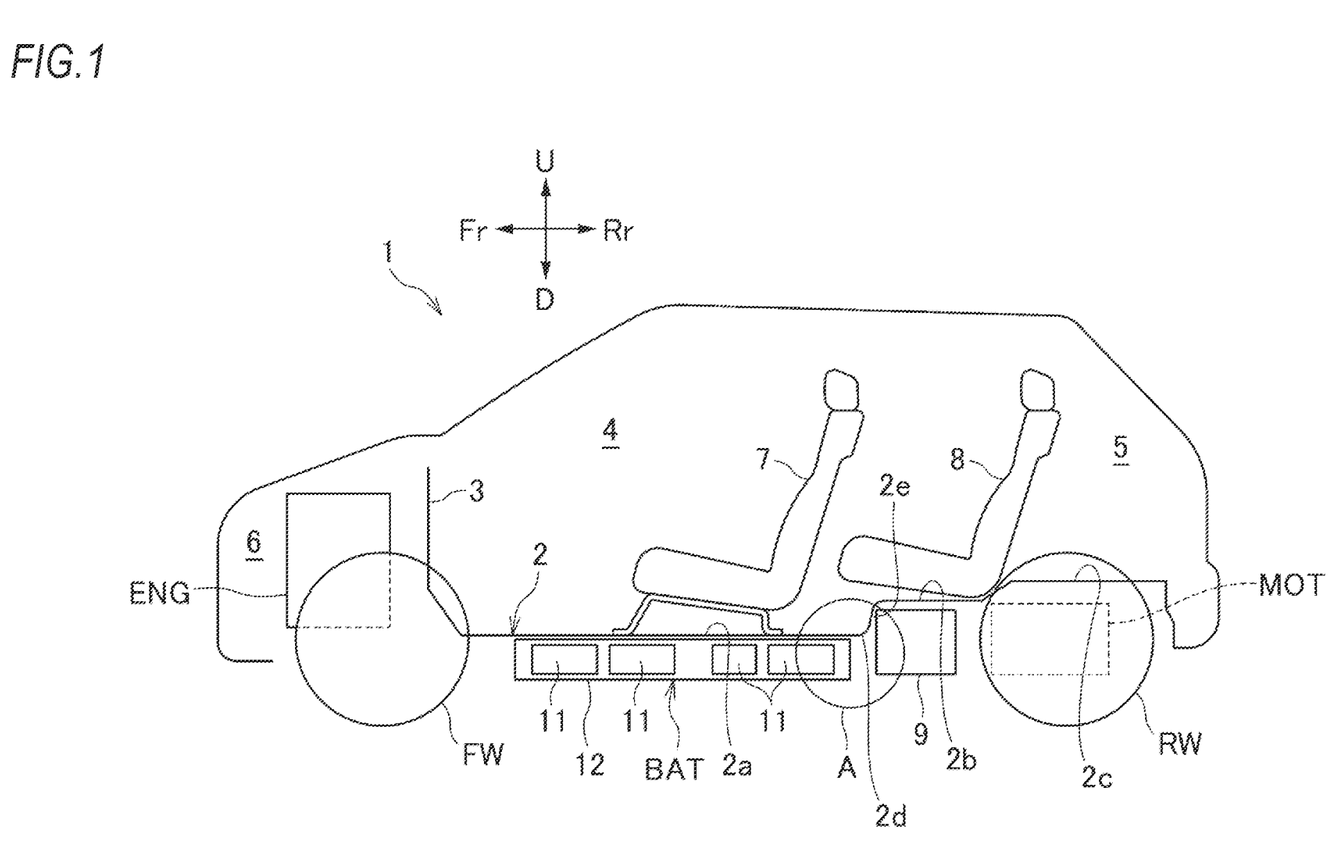
FIG. 1 is a schematic side view of a vehicle equipped with a battery pack.

As illustrated in FIG. 1, a vehicle 1 is divided into a passenger compartment 4, a luggage compartment 5, and a front room 6 in front of them by a floor panel 2 and a dash panel 3. The passenger compartment 4 is provided with a front seat 7 and a rear seat 8. The front room 6 is provided with an engine ENG as a drive source for driving left and right front wheels FW and an electric motor MOT as a drive source for driving left and right rear wheels RW is provided below the luggage compartment 5. That is, the vehicle 1 is a so-called hybrid vehicle which uses both the engine ENG and the electric motor MOT as drive sources.

A battery pack BAT and a fuel tank 9 are arranged below the floor panel 2 of the passenger compartment 4. The floor panel 2 consists of a front floor portion 2a below the front seat 7, a rear floor portion 2b below the rear seat 8, and a luggage floor portion 2c below the luggage compartment 5. Between the front floor portion 2a and the rear floor portion 2b, a bent portion 2d which bends from the front floor portion 2a and a vertical wall portion 2e which extends upward from the bent portion 2d are provided. The battery pack BAT is arranged below the front floor portion 2a. In other words, the front floor portion 2a covers an upper surface of the battery pack BAT. The fuel tank 9 is arranged below the rear floor portion 2b and the electric motor MOT is arranged below the luggage floor portion 2c.

The battery pack BAT and the electric motor MOT are connected via a DC line (not illustrated) and the engine ENG and the fuel tank 9 are connected via a fuel pipe (not illustrated). By electrically connecting the electric motor MOT and the battery pack BAT, the electric power from the battery pack BAT is supplied to the electric motor MOT during power running drive of the electric motor MOT. Further, the electric power from the electric motor MOT is supplied to the battery pack BAT during regenerative drive of the electric motor MOT.

Battery Pack

The battery pack BAT includes a plurality of batteries 11 formed by stacking a plurality of battery cells and a battery case 12 accommodating the plurality of batteries 11. Each battery cell is provided with a gas discharge valve (not illustrated). For example, when the battery cell generates heat due to some abnormality and the pressure inside the battery cell exceeds a predetermined value, the gas discharge valve opens to discharge the gas in the battery cell to the outside, that is, the inside of the battery case 12. Since the battery pack BAT has a closed structure, it is necessary to release gas to the outside of the battery case 12 when the pressure inside the battery case 12 increases. Hereinafter, a pressure release mechanism 20 of the battery pack BAT will be described.

Pressure Release Mechanism

Figure 2:
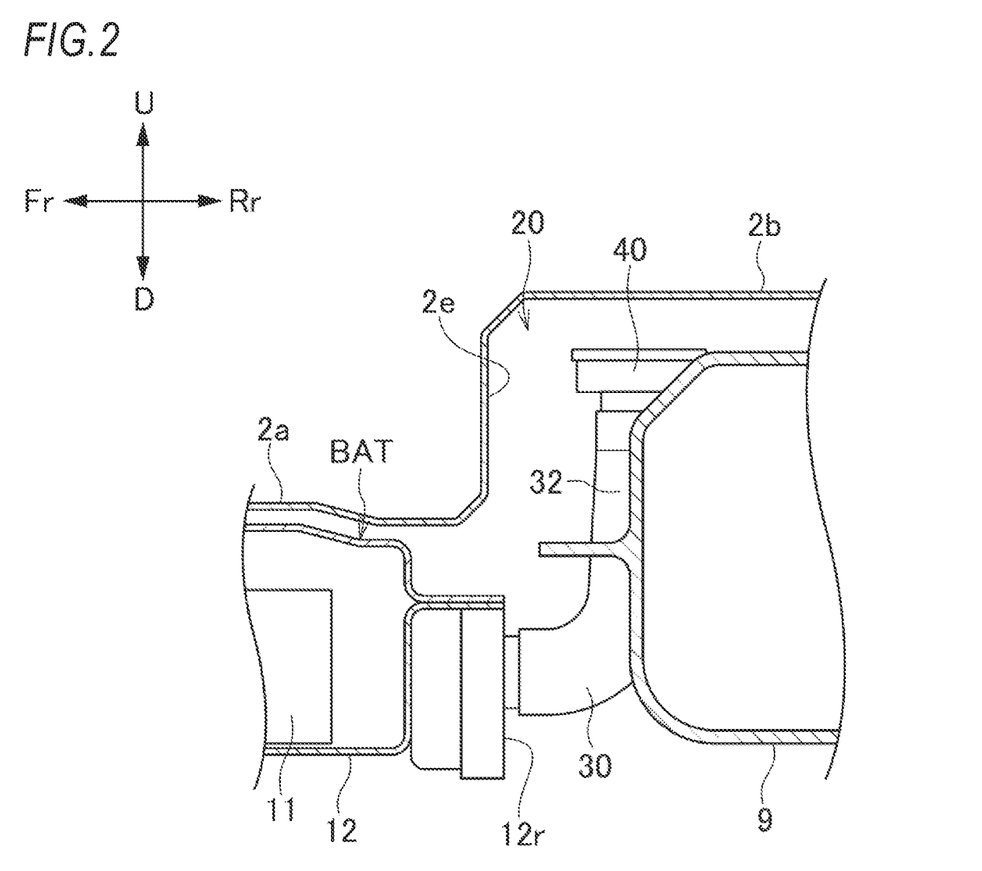
FIG. 2 is an enlarged side view of a portion A of FIG. 1.

As illustrated in FIG. 2, the pressure release mechanism 20 for releasing the pressure inside the battery case 12 includes a communication member 30 whose one end is connected to the battery case 12 and a gas discharge unit 40 which is connected to the other end of the communication member 30 and discharges gas through the communication member 30.

Figure 3:
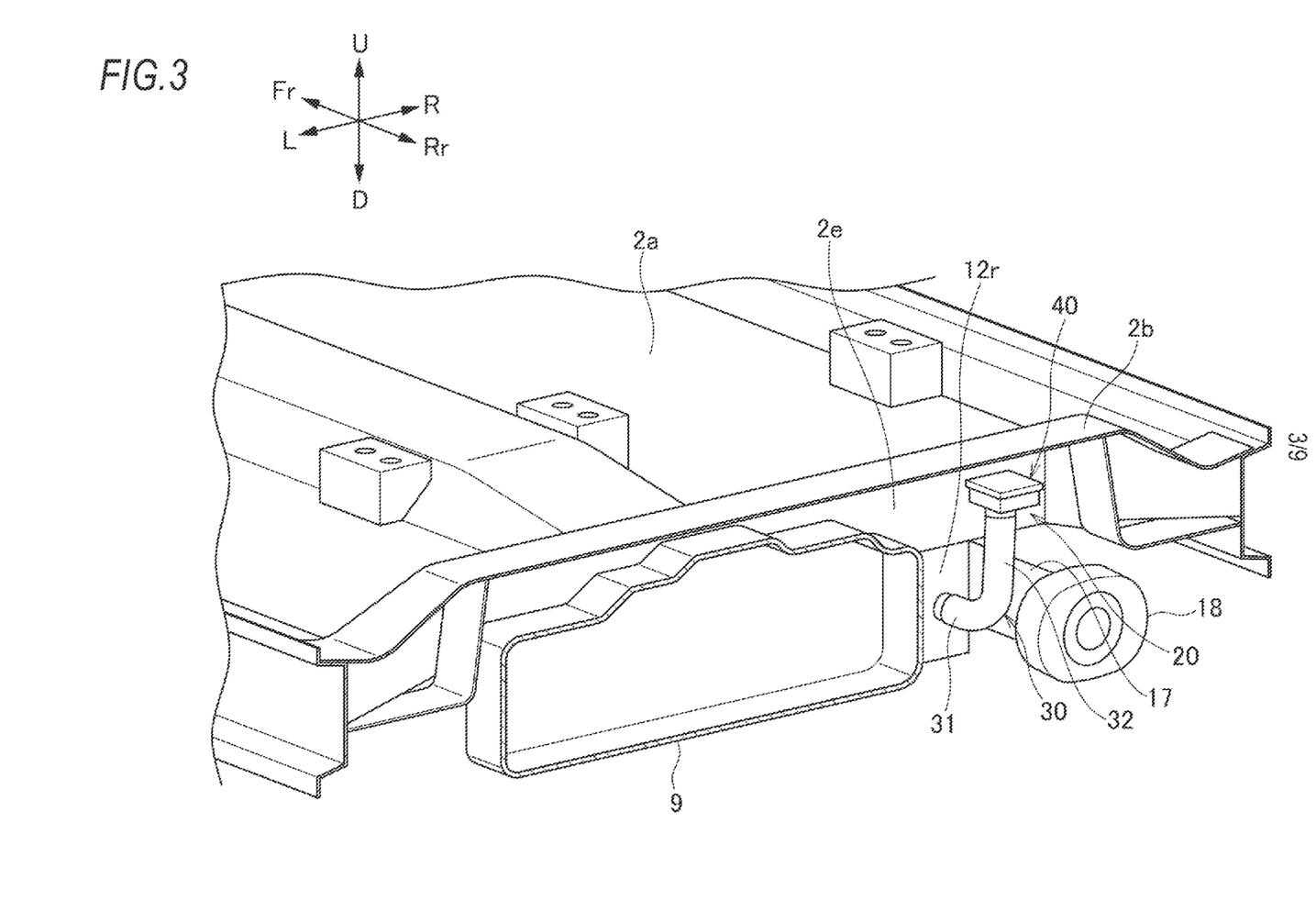
FIG. 3 is a perspective view of the portion A of FIG. 1 as viewed obliquely from the rear.
Figure 4:
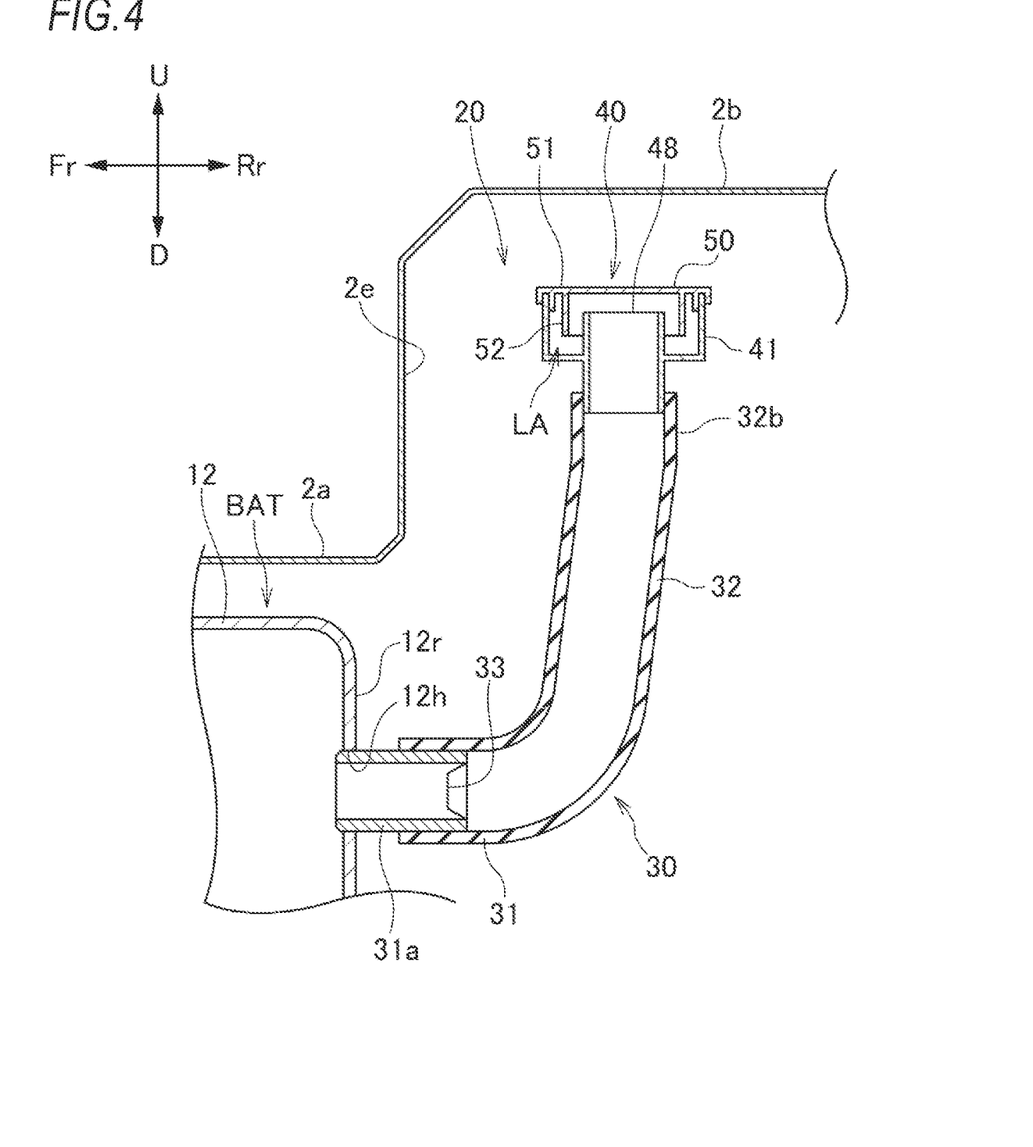
FIG. 4 is a cross-sectional view of a pressure release mechanism.

As illustrated in FIGS. 3 and 4, the communication member 30 is composed of a first pipe portion 31 and a second pipe portion 32 and has a substantially L-shape when viewed from the side. In the communication member 30, a front end 31a of the first pipe portion 31 is connected to a case opening 12h provided on a case rear surface 12r of the battery case 12 and a rear end 32b of the second pipe portion 32 is connected to the gas discharge unit 40. In the communication member 30, the first pipe portion 31 extends straight rearward from the front end 31a connected to the case rear surface 12r, and then it is bent upward so that the rear end 32b of the second pipe portion 32 faces upward and it is arranged behind the case rear surface 12r. That is, when the communication member 30 is viewed from the front-rear direction, the rear end 32b is arranged at a position where it overlaps with the vertical wall portion 2e. Since the rear end 32b of the communication member 30 to which the gas discharge unit 40 is connected is arranged so as to face upward and behind the case rear surface 12r, it is possible to prevent the gas discharge unit 40 from being exposed to water.

Figure 5:
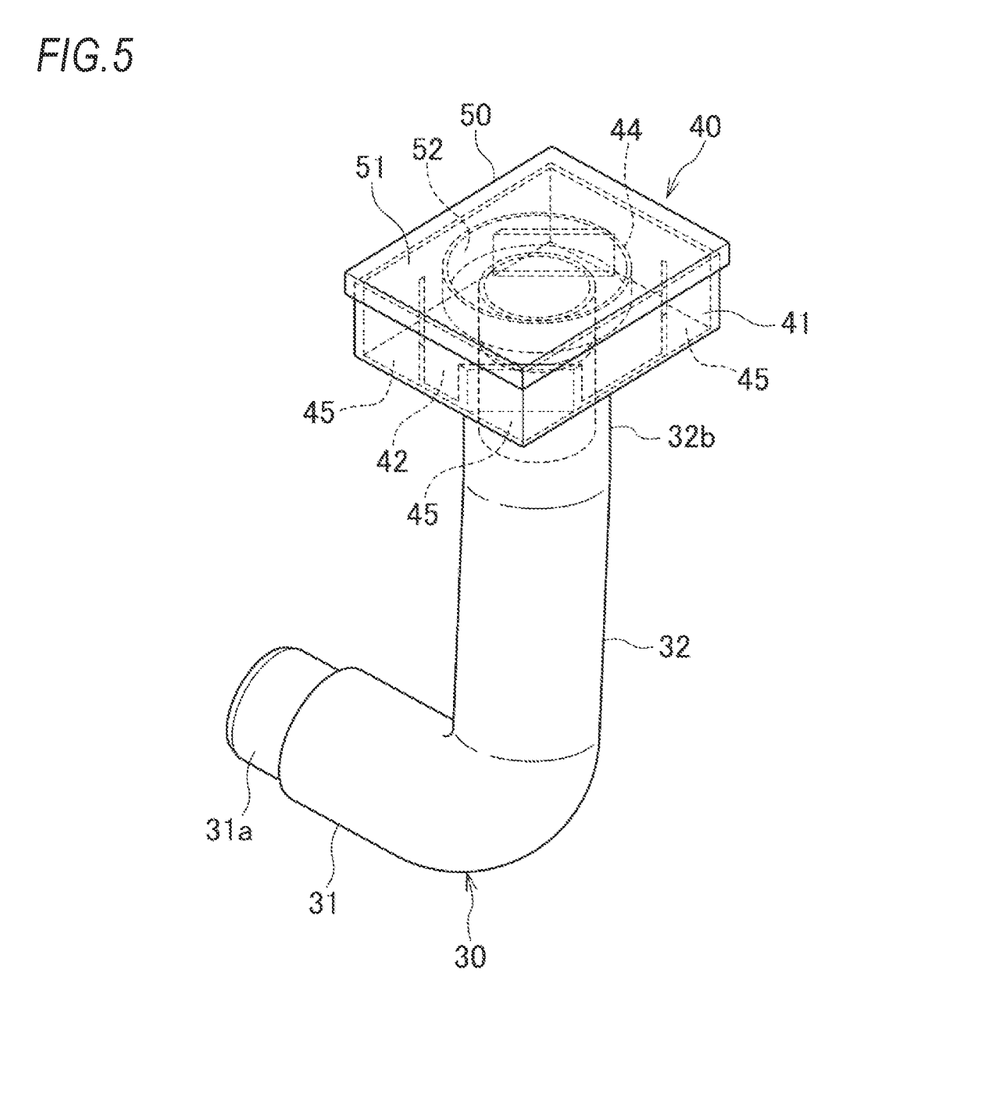
FIG. 5 is a perspective view of the pressure release mechanism.

As illustrated in FIG. 5, the gas discharge unit 40 connected to the rear end 32b of the communication member 30 has a rectangular parallelepiped shape and is configured by attaching a gas discharge unit cover 50 from above a gas discharge unit body 41.

Figure 6:
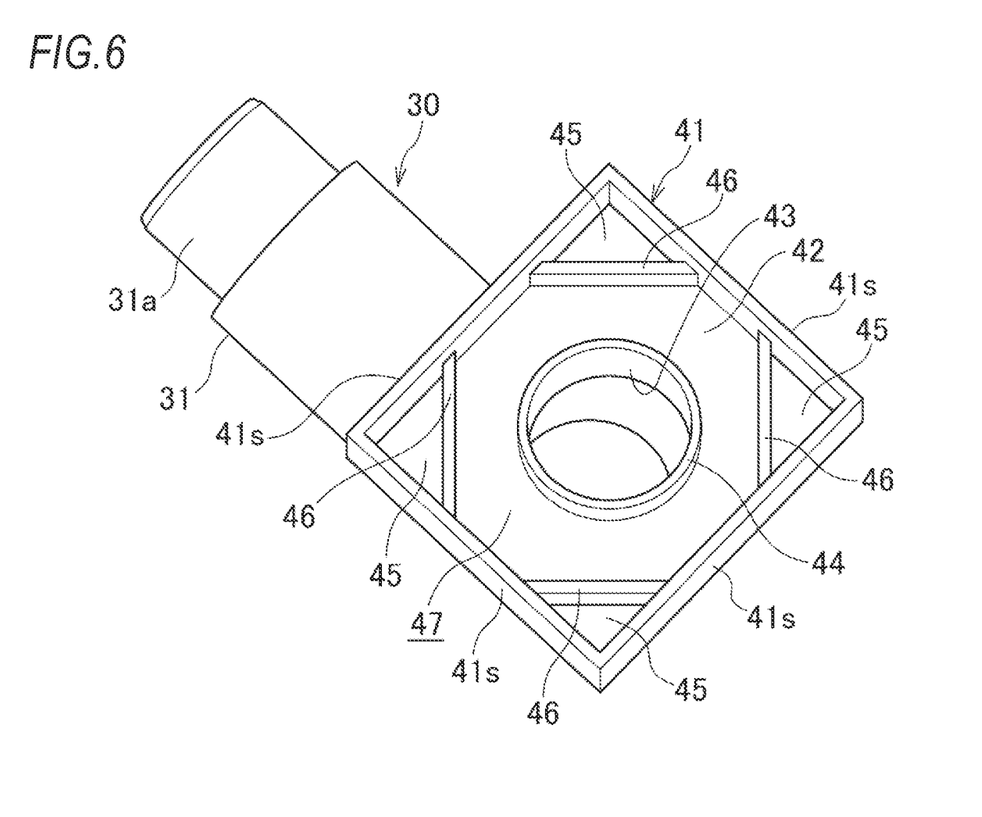
FIG. 6 is another perspective view of the pressure release mechanism.

With reference to FIG. 6, a cylindrical portion 44 having a through-hole 43 to which the communication member 30 is connected is erected in a center of a lower surface 42 of the gas discharge unit body 41 and gas discharge ports 45 having a substantially triangular shape are provided at the four corners of the lower surface 42. A lower partition wall 46 extending upward from the lower surface 42 is provided between the through-hole 43 and each gas discharge port 45 along one side of the gas discharge port 45 having a substantially triangular shape. A recess portion 47 is formed between the through-hole 43 and each gas discharge port 45 so as to surround the through-hole 43 by the cylindrical portion 44, the lower partition wall 46, and a side wall 41s of the gas discharge unit body 41. The cylindrical portion 44 is provided with a film 48 on the upper portion which allows a gas having a predetermined pressure or higher to permeate (see FIG. 4).

As illustrated in FIGS. 4 and 5, the gas discharge unit cover 50 is provided with a ring-shaped upper partition wall 52 extending downward from an upper surface 51 so as to be located in the recess portion 47 when assembled to the gas discharge unit body 41. As a result, a labyrinth structure LA is formed in the gas discharge unit 40.

Figure 7:
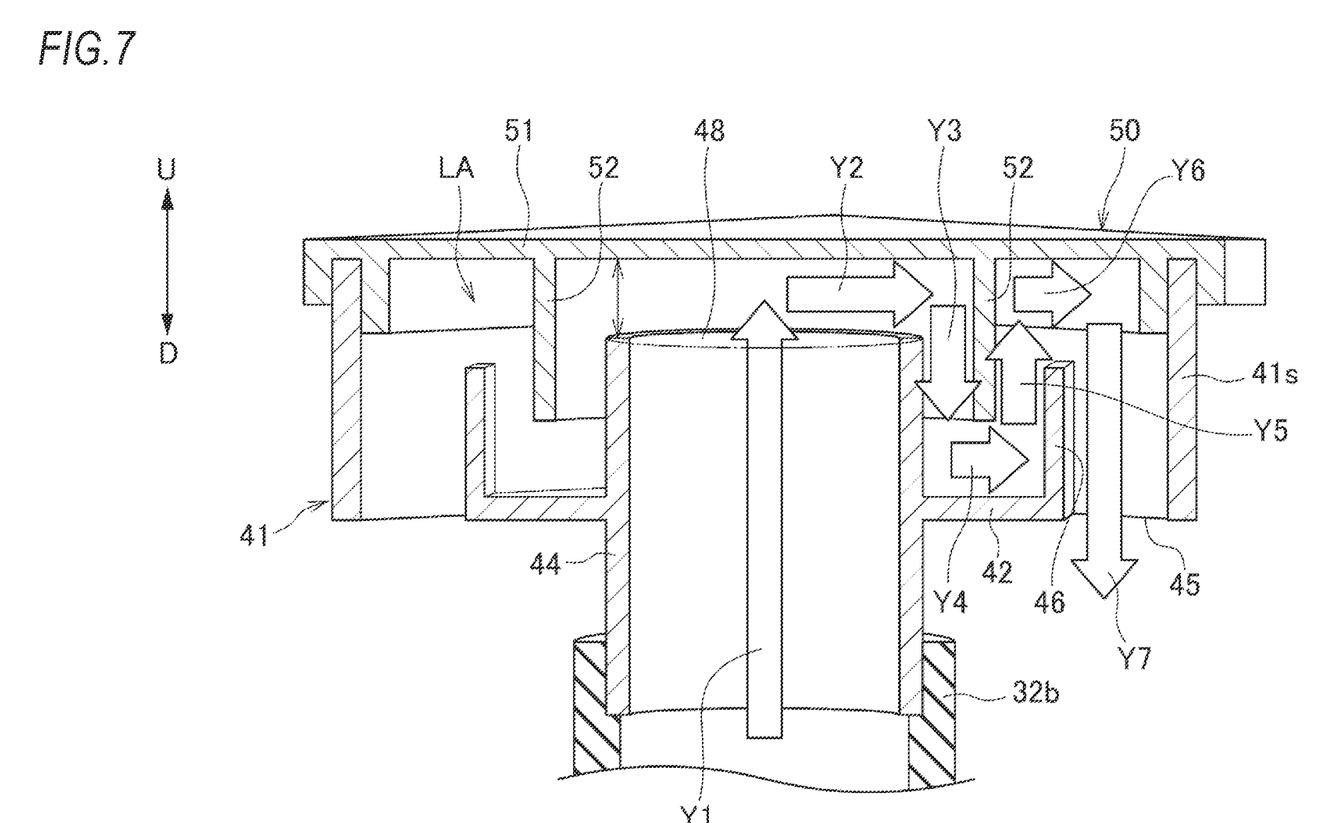
FIG. 7 is a cross-sectional view of a gas discharge unit.
Figure 8:
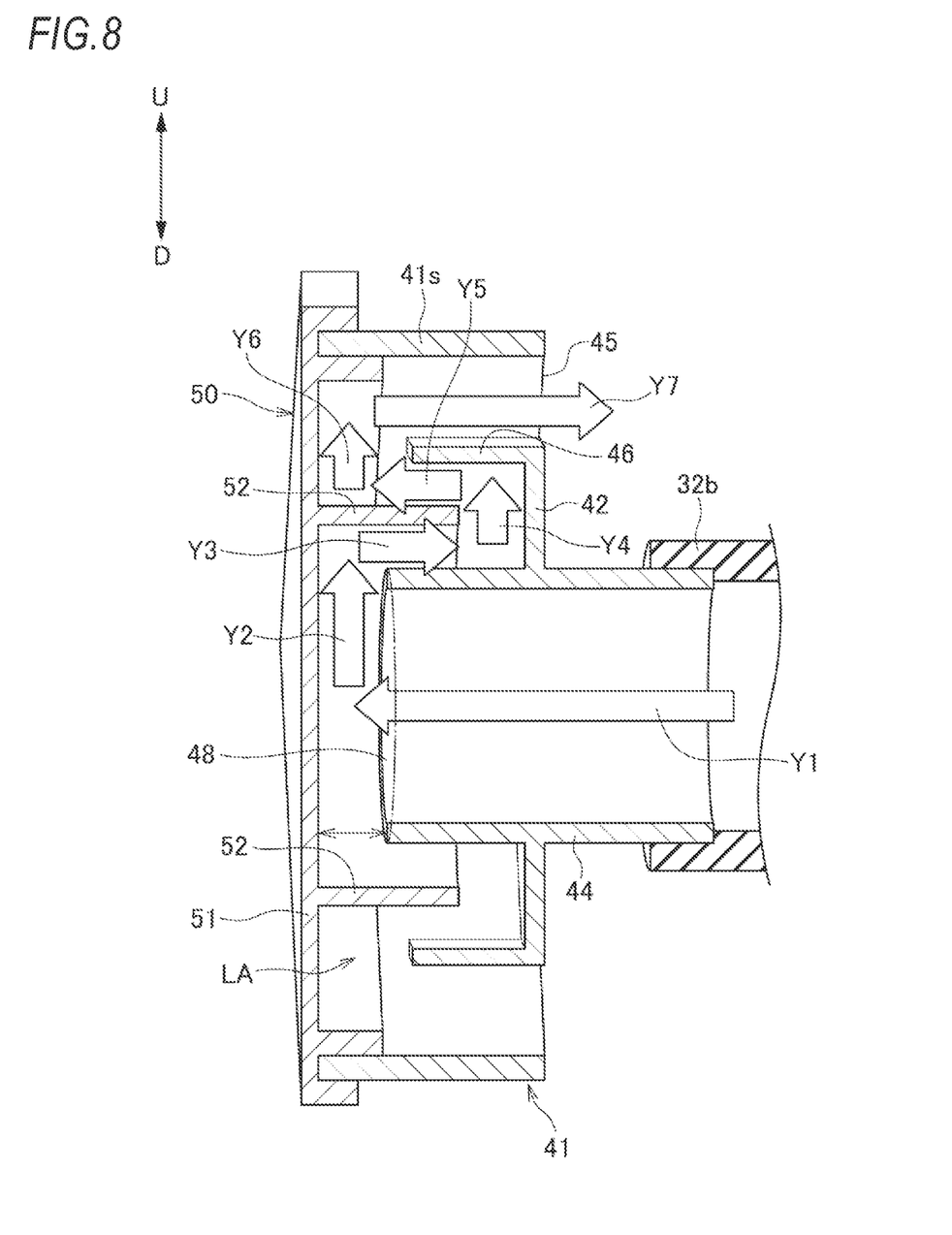
FIG. 8 is a cross-sectional view of a gas discharge unit of a first modification example.
Figure 9:
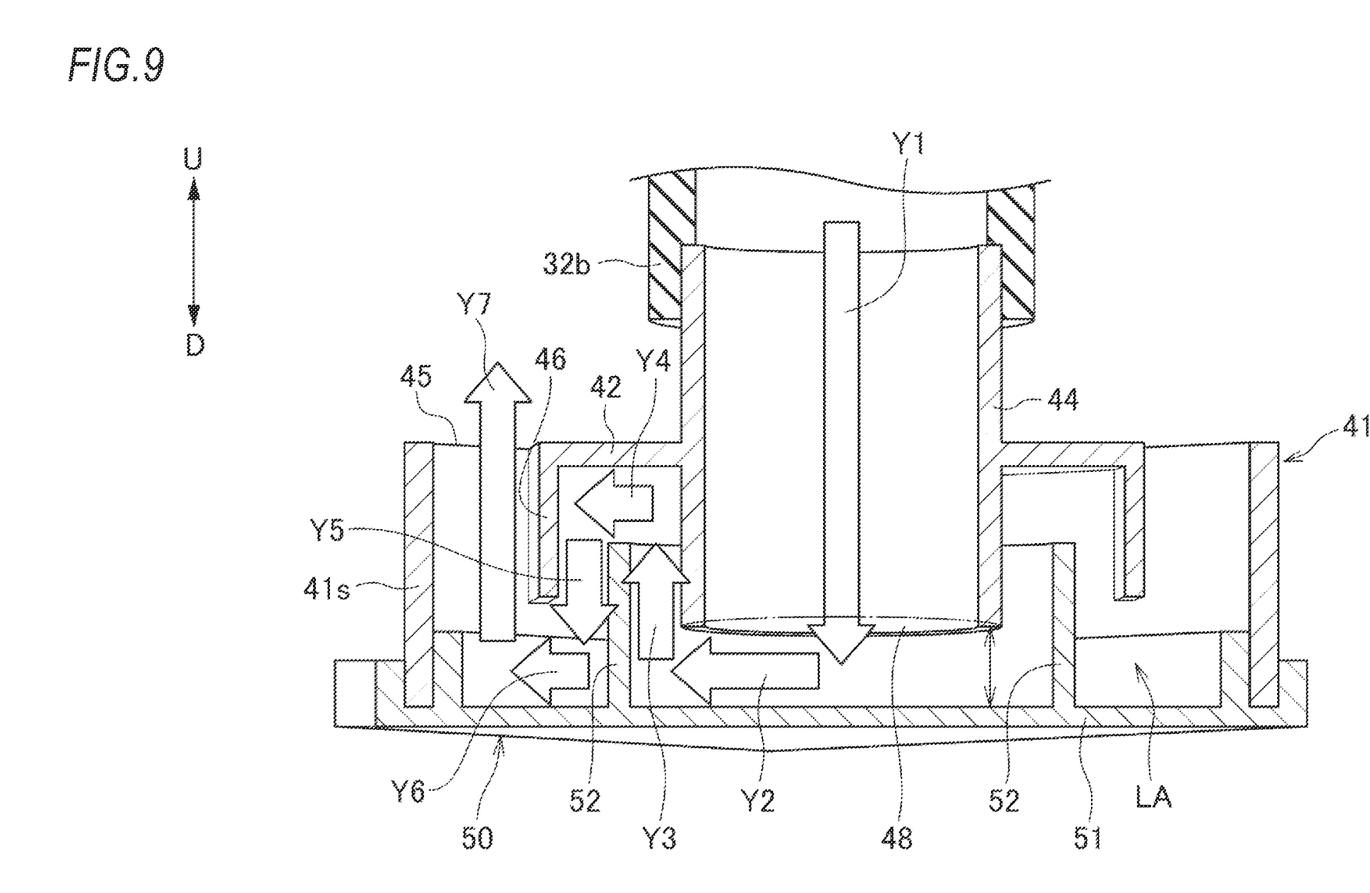
FIG. 9 is a cross-sectional view of a gas discharge pipe of a second modification example.

Next, the gas flow in the gas discharge unit 40 configured as described above will be described. In FIGS. 7 to 9, the gas flow is indicated by an arrow, but only the gas flow up to one gas discharge port 45 will be described by an arrow.

As indicated by the arrow in FIG. 7, the gas introduced into the gas discharge unit 40 via the communication member 30 flows upward through a film 48 arranged at the upper end of the cylindrical portion 44 (arrow Y1). Subsequently, the gas is guided radially outward along the upper surface 51 of the gas discharge unit cover 50 (arrow Y2), and is then guided downward by the upper partition wall 52 (arrow Y3).

Subsequently, the gas collides with the lower surface 42 of the gas discharge unit body 41 and is guided outward in the radial direction (arrow Y4), and flows upward between the upper partition wall 52 and the lower partition wall 46. Next, again, the gas collides with the upper surface 51 of the gas discharge unit cover 50 (arrow Y5). The gas which collides with the upper surface 51 of the gas discharge unit cover 50 is guided radially outward along the upper surface 51 of the gas discharge unit cover 50 (arrow Y6), and then the gas is guided downward between the lower partition wall 46 and the side wall 41s of the gas discharge unit body 41. Next, finally, the gas is discharged to the outside of the gas discharge unit 40 from the gas discharge port 45 on the lower surface 42 of the gas discharge unit body 41 (arrow Y7).

Since the labyrinth structure LA is provided in the gas discharge unit 40 in this way, the infiltration of water into the communication member 30 can be suppressed, and thus the infiltration of water into the battery pack BAT can be suppressed. Further, since the gas discharge port 45 of the gas discharge unit 40 is provided in the lower part of the gas discharge unit 40, the infiltration of water into the gas discharge unit 40 is further suppressed. Further, since the gas discharged from the gas discharge port 45 is discharged to the opposite side (lower side) of the floor panel 2, the influence of the gas on the passenger compartment 4 can be suppressed.

The arrangement of the gas discharge unit 40 is not limited to this. As in a first modification example of FIG. 8, by vertically arranging the gas discharge unit body 41, the gas discharge unit 40 may be arranged such that the cylindrical portion 44 of the gas discharge unit body 41 extends in a horizontal direction (for example, the front-rear direction and the left-right direction) orthogonal to the up-down direction and the gas discharge port 45 faces the horizontal direction.

Further, as in a second modification example of FIG. 9, by turning the gas discharge unit body 41 upside down, the cylindrical portion 44 of the gas discharge unit body 41 may extend in the up-down direction and the gas discharge unit 40 may be arranged so that the gas discharge port 45 faces upward.

Further, as illustrated in FIG. 4, the front end 31a of the communication member 30 is provided with a metal mesh member 33 so as to block the gas path. Therefore, even when a flame is generated inside the communication member 30, it is possible to suppress the flame from entering the inside of the battery pack BAT.

Returning to FIGS. 2 and 3, in the communication member 30, the second pipe portion 32 extending upward is arranged on the side of the fuel tank 9 located behind the battery pack BAT, on the right side in this embodiment. By arranging the communication member 30 and the fuel tank 9 in a vehicle width direction in this way, the layout is improved.

Further, an exhaust pipe 17 extending from the engine ENG provided in the front room 6 is provided on the side of the fuel tank 9, on the right side in this embodiment, and the second pipe portion 32 of the communication member 30 is arranged between a silencer 18 provided in the exhaust pipe 17 and the fuel tank 9 in the vehicle width direction. In this way, the second pipe portion 32 of the communication member 30 is arranged between the silencer 18 provided on the exhaust pipe 17 and the fuel tank 9 in the vehicle width direction, and thus it is possible to further suppress the gas discharge unit 40 from being exposed to water. The communication member 30 may be fixed to the vertical wall portion 2e of the floor panel 2 or may be fixed to a bracket extending from the vertical wall portion 2e, the rear floor portion 2b, or the like.

Although the embodiment of the present invention is described above, the present invention is not limited to the embodiment described above and can be appropriately modified, improved, and the like.

Further, in the embodiment described above, a hybrid vehicle using the engine ENG and the electric motor MOT as a drive source is exemplified, but an electric vehicle or a fuel cell vehicle using only the electric motor MOT as a drive source may be used.

At least the following matters are described in this specification. The components and the like corresponding to those in the embodiments described above are shown in parentheses, but the present invention is not limited to these.

(1) A battery pack (battery pack BAT) which is placed below a floor panel (floor panel 2) of a vehicle (vehicle 1), including:
  a battery (battery 11);
  a case (battery case 12) for accommodating the battery, and
  a pressure release mechanism (pressure release mechanism 20) for releasing pressure inside the case, where
  the pressure release mechanism includes:
    a communication member (communication member 30) which has one end (front end 31a) and the other end (rear end 32) and where the one end is connected to the case, and
    a gas discharge unit (gas discharge unit 40) connected to the other end of the communication member and having a labyrinth structure (labyrinth structure LA).

According to (1), the gas discharge unit which discharges the gas inside the case of the battery pack is provided with a labyrinth structure. Therefore, it is possible to suppress the infiltration of water into the communication member, thereby suppressing the infiltration of water into the battery pack.

(2) The battery pack according to (1), where
  the floor panel includes,
  a floor portion (front floor portion 2a) covering an upper surface of the battery pack,
  a bent portion (bent portion 2d) which bends from the floor portion, and
  a vertical wall portion (vertical wall portion 2e) extending upward from the bent portion,
  the one end of the communication member is connected to a case rear surface (case rear surface 12r) of the case, and
  the other end of the communication member is arranged so as to face upward and behind the case rear surface.

According to (2), the other end of the communication member to which the gas discharge unit is connected is arranged so as to face upward and behind the case rear surface. Therefore, it is possible to prevent the gas discharge unit from being flooded.

(3) The battery pack according to (2), where
  a gas discharge port (gas discharge port 45) of the gas discharge unit is provided in a lower part of the gas discharge unit.

According to (3), since the gas discharge port is provided in the lower part of the gas discharge unit, the infiltration of water into the gas discharge unit is suppressed. In addition, since the gas discharged from the gas discharge port is discharged to a side opposite to the floor panel, the influence of the gas on the passenger compartment can be suppressed.

(4) The battery pack according to (2) or (3), where
  the battery pack is arranged in front of a fuel tank (fuel tank 9) of the vehicle, and
  a part of the communication member is arranged on a side (right side) of the fuel tank.

According to (4), the layout is improved by arranging the communication member and the fuel tank in the vehicle width direction.

(5) The battery pack according to any one of (1) to (4), where
  the communication member is provided with a metal mesh member (mesh member 33) so as to block a gas path.

According to (5), even when a flame is generated inside the communication member, it is possible to suppress the flame from entering the inside of the battery pack.

(6) The battery pack according to (4), where
  an exhaust pipe (exhaust pipe 17) is provided on the side of the fuel tank, and
  the communication member is arranged between a silencer (silencer 18) provided in the exhaust pipe and the fuel tank in a vehicle width direction.

According to (6), the communication member is arranged between the silencer provided in the exhaust pipe and the fuel tank in the vehicle width direction. Therefore, it is possible to further suppress the gas discharge unit from being flooded.

What is claimed is:

1. A battery pack which is placed below a floor panel of a vehicle, comprising:
  a battery;
  a case for accommodating the battery; and
  a pressure release mechanism for releasing pressure inside the case, wherein
  the pressure release mechanism includes,
    a communication member which has one end and the other end and where the one end is connected to the case, and
    a gas discharge unit connected to the other end of the communication member and having a labyrinth structure,
  a gas introduced into the gas discharge unit is discharged in a direction opposite to a direction in which the gas is introduced, and
  the gas discharge unit includes a gas discharge unit body having a rectangular parallelepiped shape.

2. The battery pack according to claim 1, wherein
  the floor panel includes,
    a floor portion covering an upper surface of the battery pack,
    a bent portion which bends from the floor portion, and
    a vertical wall portion extending upward from the bent portion,
  the one end of the communication member is connected to a case rear surface of the case, and
  the other end of the communication member is arranged so as to face upward and behind the case rear surface.

3. The battery pack according to claim 2, wherein
a gas discharge port of the gas discharge unit is provided in a lower part of the gas discharge unit.

4. The battery pack according to claim 2, wherein
the battery pack is arranged in front of a fuel tank of the vehicle, and
a part of the communication member is arranged on a side of the fuel tank.

5. The battery pack according to claim 1, wherein
the communication member is provided with a metal mesh member so as to block a gas path.

6. The battery pack according to claim 4, wherein
an exhaust pipe is provided on the side of the fuel tank, and
the communication member is arranged between a silencer provided in the exhaust pipe and the fuel tank in a vehicle width direction.

7. The battery pack according to claim 1, wherein
the gas discharge unit further includes a gas discharge unit cover provided above the gas discharge unit body.

8. The battery pack according to claim 7, wherein
the gas discharge unit cover is provided with a ring-shaped upper partition wall extending downward from an upper surface to be located in a recess portion when assembled to the gas discharge unit body so that the labyrinth structure is formed in the gas discharge unit.

9. The battery pack according to claim 1, wherein
the gas discharge unit further includes a gas discharge unit cover provided above the gas discharge unit body,
a cylindrical portion having a through hole to which the communication member is connected is erected in a center of a lower surface of the gas discharge unit body,
gas discharge ports are provided at four corners of the lower surface,
a lower partition wall extending upward from the lower surface is provided along one side of each respective one of the gas discharge ports,
a recess portion is formed between the through hole and each of the gas discharge ports to surround the through hole by the cylindrical portion, the lower partition wall, and a side wall of the gas discharge unit body, and
the gas discharge unit cover is provided with a ring-shaped upper partition wall extending downward from an upper surface to be located in the recess portion when assembled to the gas discharge unit body so that the labyrinth structure is formed in the gas discharge unit.

10. A battery pack which is placed below a floor panel of a vehicle, comprising:
a battery;
a case for accommodating the battery; and
a pressure release mechanism for releasing pressure inside the case, wherein
the pressure release mechanism includes,
a communication member which has one end and the other end and where the one end is connected to the case, and
a gas discharge unit connected to the other end of the communication member and having a labyrinth structure,
a gas introduced into the gas discharge unit is discharged in a direction opposite to a direction in which the gas is introduced,
the gas discharge unit includes a gas discharge unit body,
a cylindrical portion having a through hole to which the communication member is connected is erected in a center of a lower surface of the gas discharge unit body, and
gas discharge ports are provided at four corners of the lower surface.

11. The battery pack according to claim 10, wherein
a lower partition wall extending upward from the lower surface is provided along one side of each respective one of the gas discharge ports, and
a recess portion is formed between the through hole and each of the gas discharge ports to surround the through hole by the cylindrical portion, the lower partition wall, and a side wall of the gas discharge unit body.

12. The battery pack according to claim 11, wherein
the gas discharge unit further includes a gas discharge unit cover provided above the gas discharge unit body, and
the gas discharge unit cover is provided with a ring-shaped upper partition wall extending downward from an upper surface to be located in the recess portion when assembled to the gas discharge unit body so that the labyrinth structure is formed in the gas discharge unit.

\* \* \* \* \*